(12) United States Patent
Frank

(10) Patent No.: US 7,303,231 B2
(45) Date of Patent: *Dec. 4, 2007

(54) MASSAGE APPARATUS AND METHOD FOR LUMBAR SUPPORT

(75) Inventor: Richard Frank, Elchingen (DE)

(73) Assignee: L&P Property Management Company, South Gate, CA (US)

(*) Notice: Subject to any disclaimer, the term of this patent is extended or adjusted under 35 U.S.C. 154(b) by 309 days.

This patent is subject to a terminal disclaimer.

(21) Appl. No.: 10/532,549

(22) PCT Filed: Oct. 29, 2003

(86) PCT No.: PCT/US03/34487

§ 371 (c)(1),
(2), (4) Date: Apr. 22, 2005

(87) PCT Pub. No.: WO2004/041117

PCT Pub. Date: May 21, 2004

(65) Prior Publication Data

US 2006/0152050 A1    Jul. 13, 2006

(51) Int. Cl.
*B60N 2/66* (2006.01)

(52) U.S. Cl. .................................... 297/284.4

(58) Field of Classification Search ............ 297/230.4, 297/230.11, 284.1, 284.4, 284.7; 601/134
See application file for complete search history.

(56) References Cited

U.S. PATENT DOCUMENTS

| 2,582,115 | A |   | 1/1952 | Goodeve .................... 155/182 |
| 4,421,110 | A | * | 12/1983 | DeLisle et al. ............. 601/134 |
| 5,217,278 | A | * | 6/1993 | Harrison et al. ......... 297/284.7 |
| 5,567,011 | A |   | 10/1996 | Sessini ................... 297/284.7 |
| 5,651,583 | A | * | 7/1997 | Klingler et al. .......... 297/284.4 |
| 5,775,773 | A | * | 7/1998 | Schuster et al. ......... 297/284.1 |
| 5,797,861 | A |   | 8/1998 | Port ........................... 601/134 |
| D413,985 | S |   | 9/1999 | Martin et al. .............. D24/211 |
| 6,296,308 | B1 |   | 10/2001 | Cosentino et al. ....... 297/284.4 |
| 6,589,143 | B2 |   | 7/2003 | Taylor ........................ 482/134 |

* cited by examiner

*Primary Examiner*—Peter R. Brown
(74) *Attorney, Agent, or Firm*—Husch & Eppenberger LLC; Grant D. Kang

(57) ABSTRACT

An ergonomic support mountable on various seat frames has a static portion (52) with anchors and mounts. The mounts adapt to fix said static portion to varying seat frames. An active portion (54) is operatively engaged with the anchors of the static portion such that the active portion can move in and out of a plane defined by the frame of the seat. The active portion has a pressure surface with a smooth base level (64). There are convexities (62) in the base level that impart a massage effect on a seat occupant. At least one actuator engages the active portion but only by an actuating linkage.

12 Claims, 5 Drawing Sheets

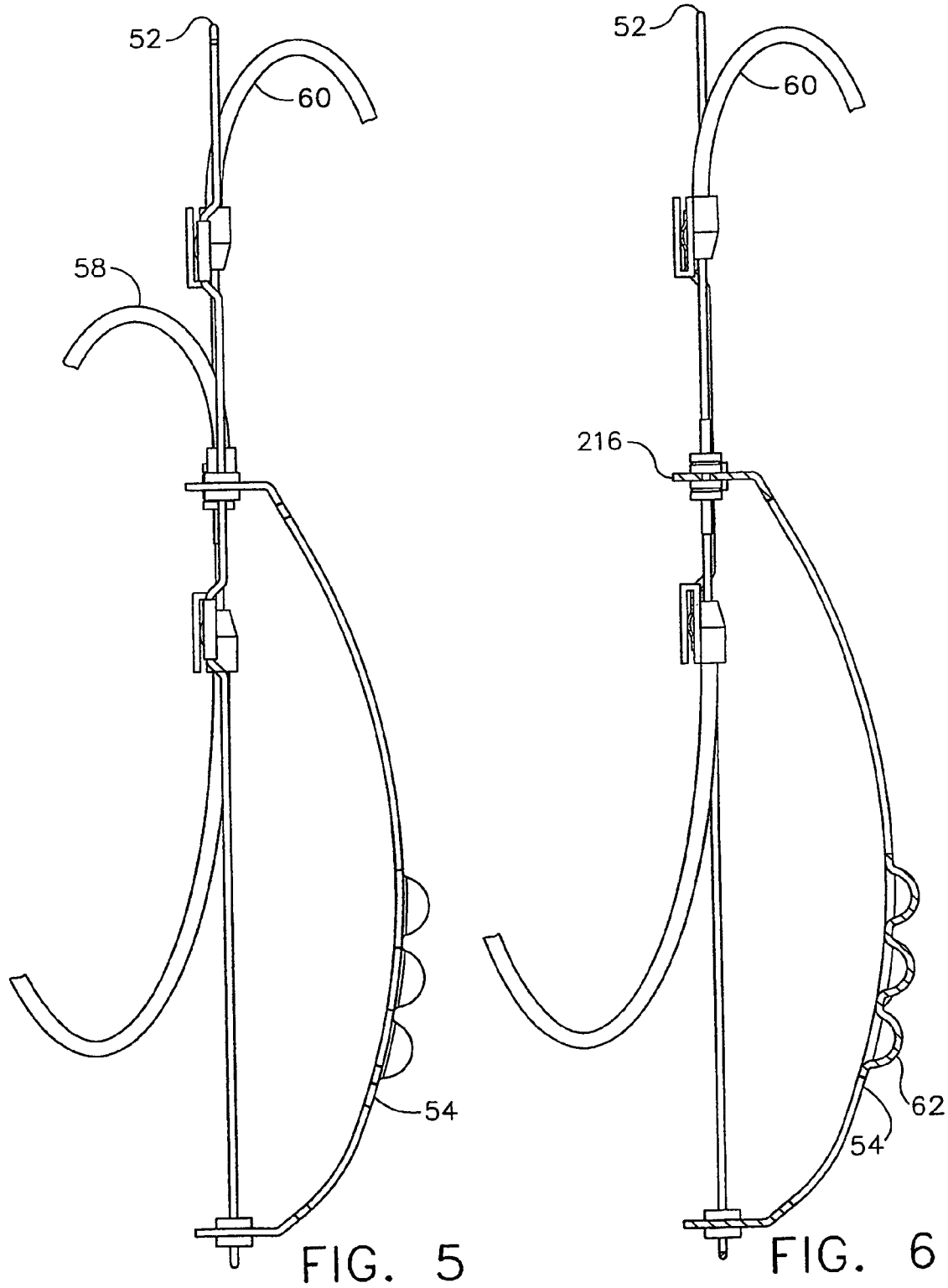

MASSAGE APPARATUS AND METHOD FOR LUMBAR SUPPORT

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention is in the field of ergonomic supports for seats, especially automobile seats.

2. Prior Art

Ergonomic supports for seats, especially automobile seats that impart a massage type effect on the seat occupant, are known in the art. See, e.g., U.S. patent application Ser. No. 09/536,425, incorporated by reference herein. Typically such prior art massage systems involve an active portion which moves toward and away from a portion of the seat occupant's anatomy to be supported, for example the lumbar spine. The active portion includes a surface that can be put into a variety of selectable positions supporting the spine to a greater or lesser degree. The moving or active portion of the lumbar support is typically a bowing or arching surface movable from a substantially flat position to a substantially bowed position which provides lumbar support.

The prior art devices also require a static portion. For example guide rails—which do not move—provide an anchor along which the active portion can slide or otherwise move through its range of selectable positions.

Alternative designs include push paddle type supports that extend or retract at the end of a linkage or through a channel. See, e.g., U.S. patent application Ser. No. 09/798,657, incorporated by reference herein. Still other options include strap devices that can be tightened or loosened in their relationship with a fixed component in order to move a supporting surface closer or further away from the spine of the seat occupant. See, e.g., U.S. Pat. No. 5,769,490, incorporated by reference herein. Generically, all of these systems have a moving or active portion and a static portion having some type of anchor on which the active portion is mounted and against which it can move to support the load of the seat occupant's weight.

Ergonomic supports for seats have actuating linkages. Frequently these linkages are traction cables such as Bowden cables. Bowden cables are comprised of a conduit containing a wire that slides axially through the conduit (also "sleeve", or "sheath") to apply or release traction on the active portion of the lumbar support. The traction moves the active portion into its supporting position and the release of the traction moves the active portion out of its supporting position. For example, in the arching type of ergonomic support the Bowden cable sleeve is mounted to one end of the arching pressure surface of the active portion and the Bowden cable wire is mounted to another end of the active pressure surface. Thereby, traction on the wire draws the two ends of the arching surface towards one another, inducing the arch that supports the seat occupant. Release of the tension allows the arching pressure surface to return to its flat position. Alternative actuating linkages may include rods, wires, rack and pinion devices, compression arrangements, eccentric wheels and the like. See, e.g., U.S. Pat. No. 5,498,063, incorporated by reference herein.

Some prior art lumbar supports cycled automatically through a range of motion. See, e.g., U.S. Pat. No. 6,007,151, incorporated by reference herein.

In the class of lumbar supports known in the art as massage systems, the pressure surface or active portion is modified by having rollers. The rollers are intended to impart a massage type feel to the seat occupant. Accordingly, the active portions are required to support an array of axles or pins on which to mount rollers, along with supporting the array of rollers themselves. The roller arrays in the prior art can be heavy, expensive and cumbersome. Moreover, the additional comfort imparted to the seat occupant by the presence of rollers is often only marginally better than the comfort afforded by the movement of the active portion of the lumbar support in the first place. In some configurations in some seats, empirical evidence indicates that rolling can be eliminated without sacrificing passenger comfort.

The presence of heavy and cumbersome active portions having roller arrays has, in the prior art, required rigid mounting of actuators. Actuators can be manual, but more typically are electrical motors for massaging systems. The actuators generally have an electrical motor operatively engaged with a gear assembly in a housing. The gear assembly typically has a seat or mount for one linkage portion, for example the wire of the Bowden cable, and the housing will have a seat or a mount for another portion of the linkage, for example the Bowden cable conduit. Because a heavy gauge of active portion components is necessary to support an array of rollers, larger motors and actuators are required to move the active portion on prior art massage systems. Moreover, the actuators and motors must be rigidly mounted to the static portion or anchor portion of the ergonomic support. Rigid mounting requires brackets which add further weight and expense.

Seat assemblers consider the "package size" of the entire device to be the widest, tallest and thickest dimensions of the ergonomic support unit as a whole. There is a continuing need in the furniture and automobile seat industry for reducing the total package size and weight, as well as the expense of ergonomic supports. Proliferating comfort systems in seats, such as heating and cooling ducts, require that traditional ergonomic devices such as lumbar supports should be made smaller and lighter. The prior art massage systems were large, heavy and expensive for two primary reasons. Large heavy active portions were required to support an array of rollers, and heavy mounting brackets were used to hold motors and actuators to the static portion of the unit. There is a need in the industry to reduce the weight, size and expense of the roller array on the active portion of a massaging lumbar support, and to reduce the width, thickness and weight of the unit as a whole, particularly by disengaging the actuators from being mounted directly to the static portion of the lumbar support.

SUMMARY OF THE INVENTION

The present invention is a massaging ergonomic support, such as lumbar support, that is smaller, thinner, lighter and more economical than prior art massaging lumbar supports. The present invention imparts the tactile effect of massaging, but without rollers. It does so by using an active portion or pressure surface that has integral undulations, corrugations or bumps on it, rather than being smooth. These surface variations may be imparted to the pressure surface of the active portion through molding in plastic or stamping in metal.

The massage lumbar support of the present invention further reduces size, weight and expense by eliminating the need for actuators to be directly mounted to the static portion of the ergonomic support. In the present invention, actuator gearboxes and motors are connected to the static and/or active portions of the lumbar support only by the actuating linkage, such as a Bowden cable. The weight and size of the mounting brackets is thereby saved. Instead, the actuators are capable of being mounted directly on any seat-frame. Accordingly, the added advantage of being readily customizable for mounting in any seat-frame is gained. Moreover, the size and power of the actuators and motors required to move the present pressure surface with molded surface variations is not as great as that required for prior art massaging lumbar supports.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 5; is a side view of the massage system; and

FIG. 6; is a cross section of the pressure surface of the present massage system.

DETAILED DESCRIPTION OF THE PREFERRED EMBODIMENTS

Figure 1:
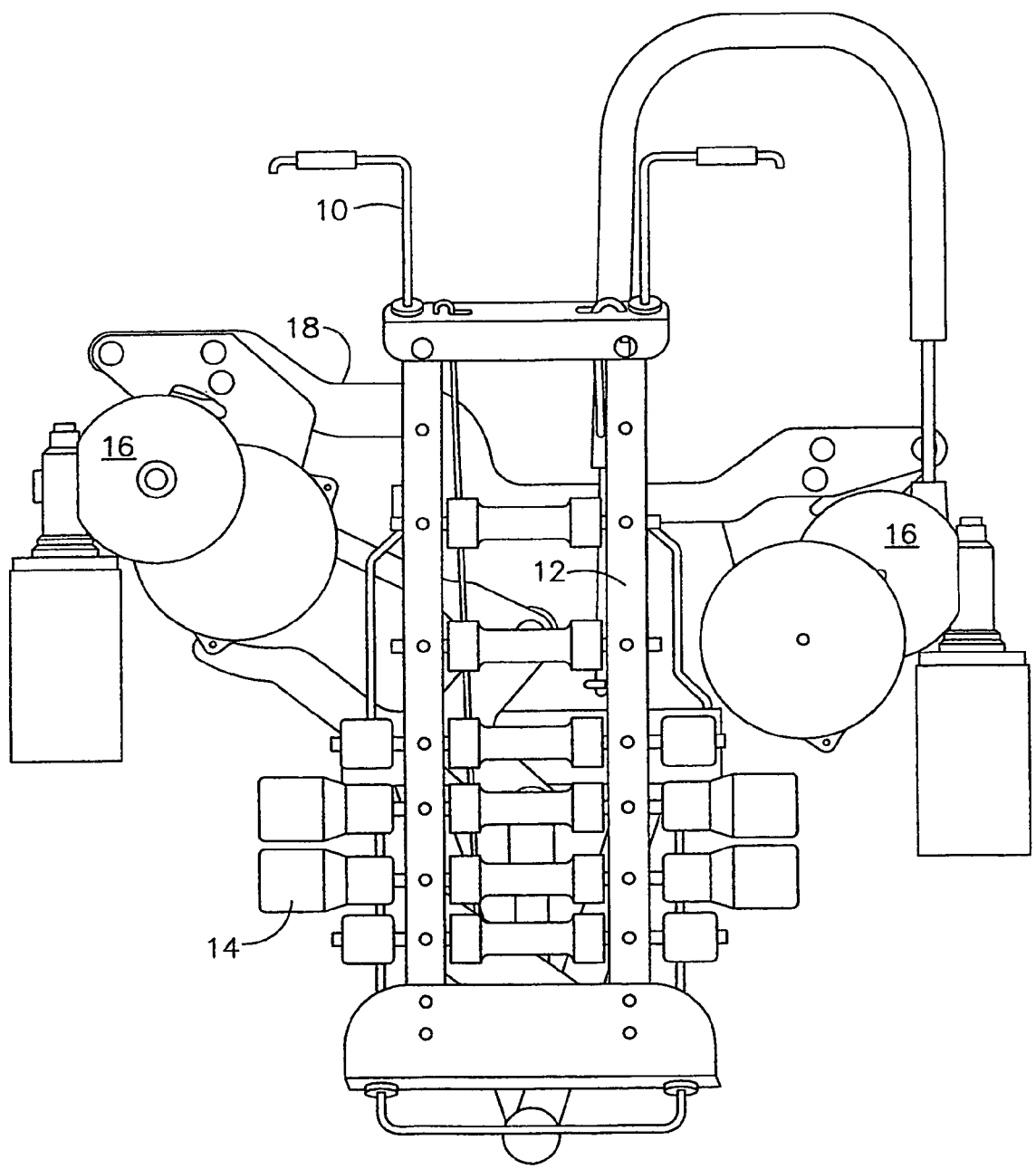
FIG. 1; is a front view of prior art massaging lumbar support.

Referring to the accompanying drawings in which like reference numbers indicate like elements, FIG. 1 illustrates a prior art massaging lumbar support. The prior art support has a static portion 10. In the depicted embodiment this is a pair of guide rails. An active portion 12 is an arching pressure surface. The arching pressure surface of the prior art supports an array of rollers 14. Actuators 16 move the active portion 12 up and down and in and out. One or both of the prior art actuators 16 were held onto the static portion 10 by brackets 18.

Figure 2:
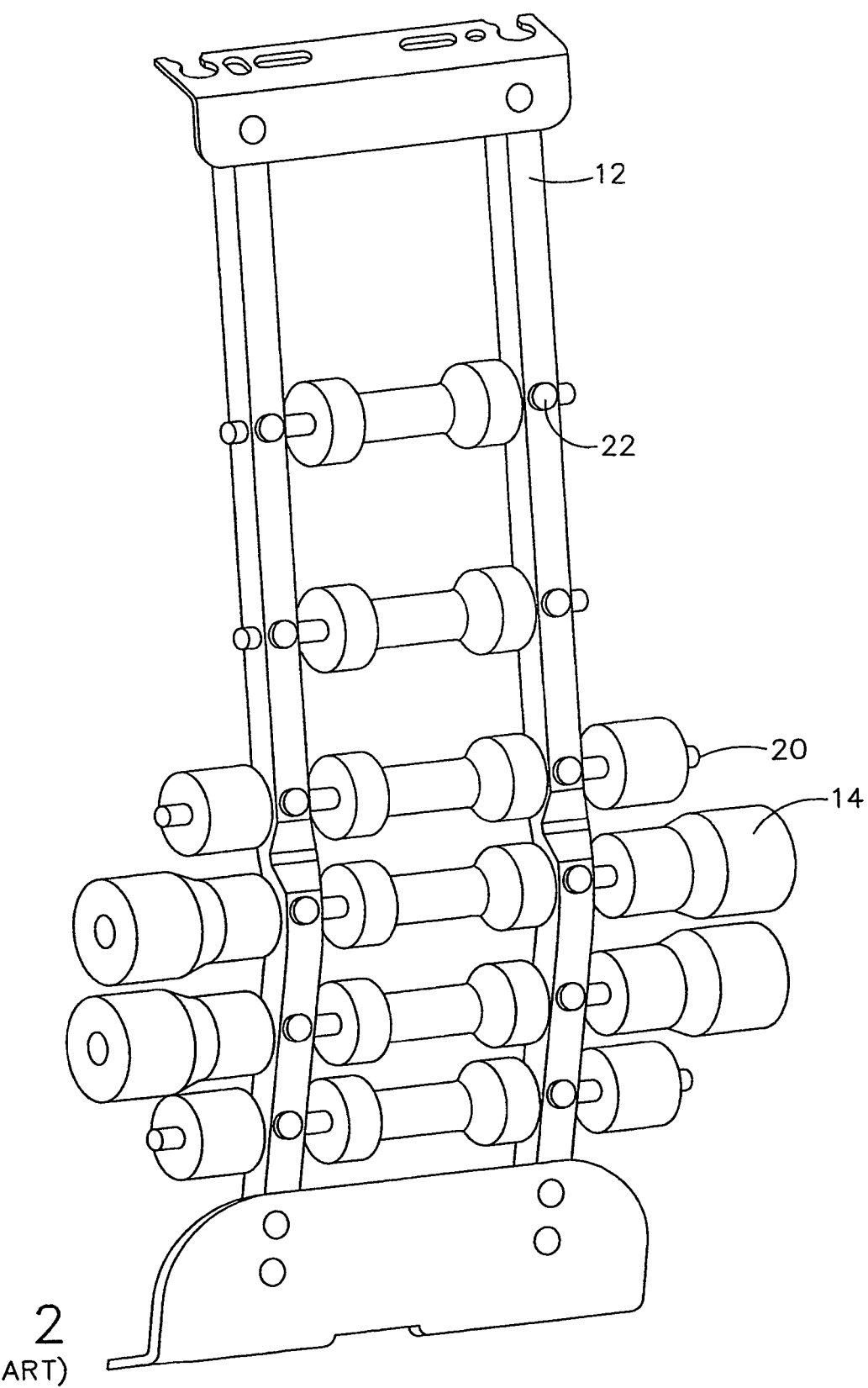
FIG. 2; is a front, perspective view of the arching pressure surface of the prior art device, with a roller array.

FIG. 2 is a perspective view of an arching pressure surface for a prior art massaging lumbar support. As can be seen, the arching pressure surface 12 supported an array of rollers 14. Each of the rollers 14 had to be supported by an axle or pin 20. The axles and pins had to be fixated to the arching pressure surface 12 by rivets, welds or the like 22. This structure is heavy, complex, expensive and cumbersome. This size, weight and expense makes the prior art devices unfeasible for automobile seats outside the class of large, luxury automobiles.

Figure 3:
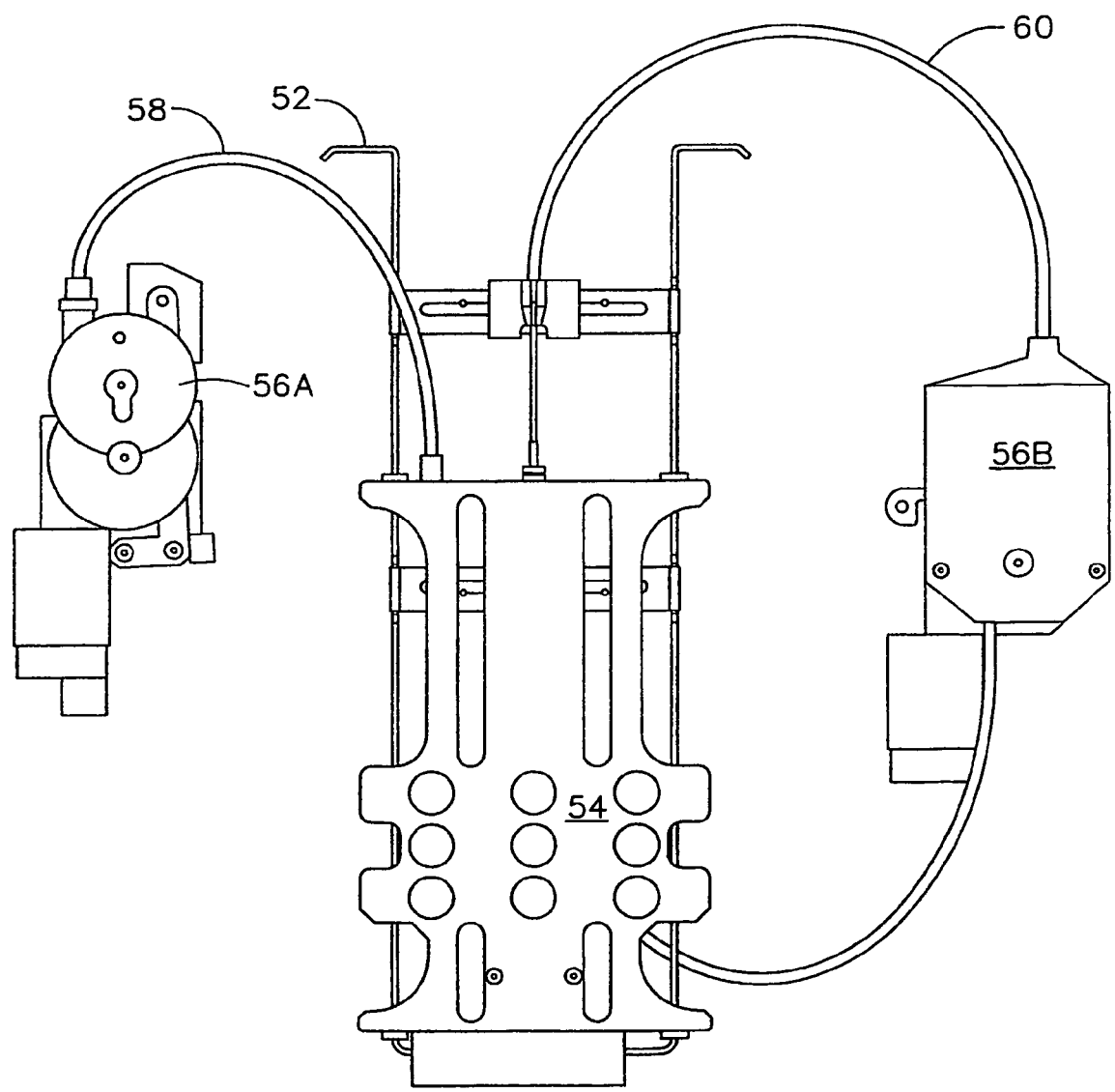
FIG. 3; is a front view of the present massage system.
Figure 4:
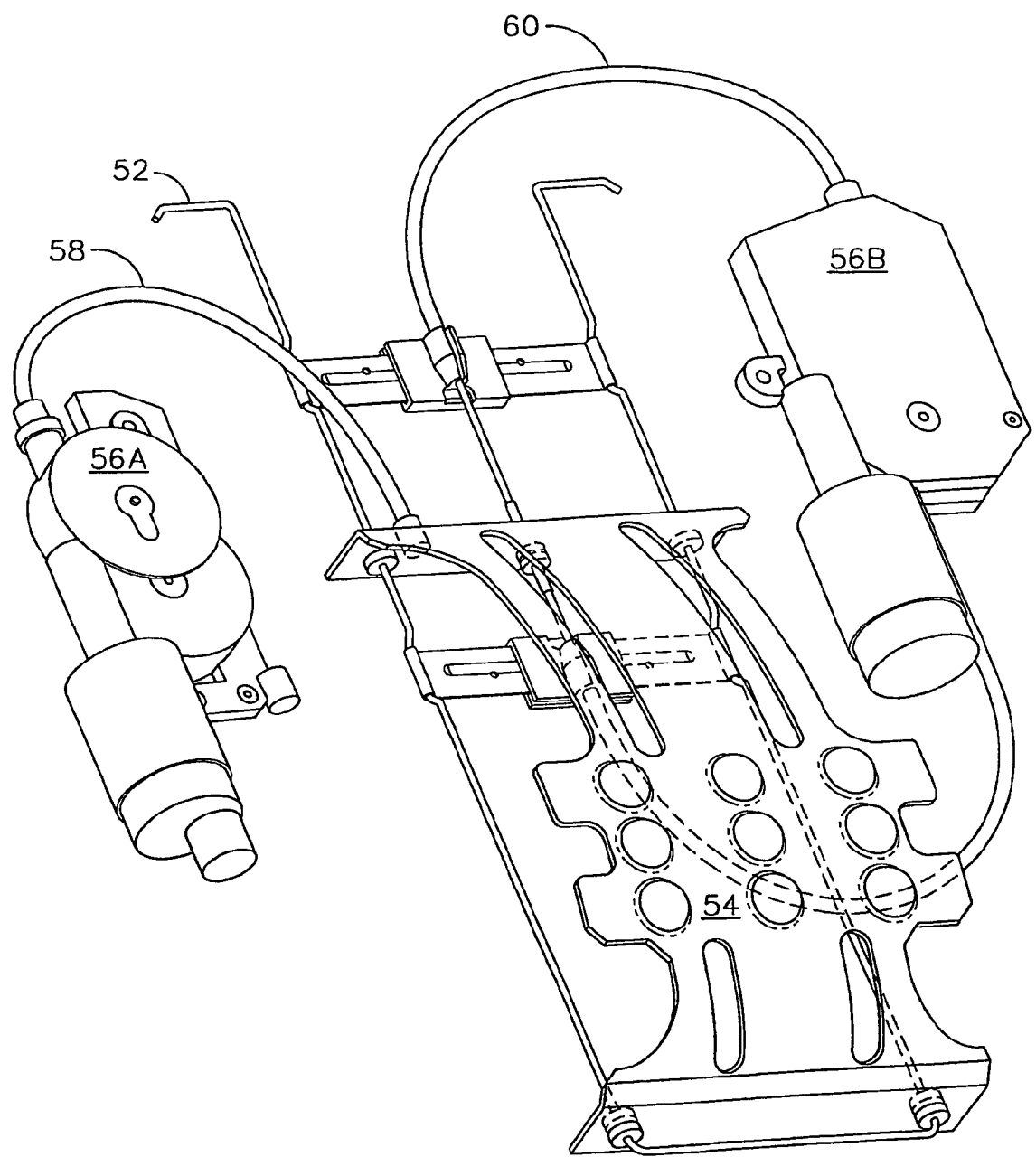
FIG. 4; is a perspective view of the massage system.

Referring now to FIGS. 3, 4 and 5 which are front, perspective and side views, respectively, of the massage system apparatus of the present invention, the massage system is capable of being mounted on preexisting static portions 52 without requiring any expensive modification to the static portions. The same principle would be true of preexisting static portions for push paddle or tensioning strap type lumbar supports. The static portion 52—which are guide rails in the depicted embodiment—will mount to any seat frame (not shown) according to mounting techniques known in the prior art.

The active portion 54 has a textured, non-smooth surface with waves, corrugations undulations or bumps for imparting the desired tactile effect to a seat occupant. The active portion 54 has a pressure surface with a base level, that is "smooth." That is, the base level of the pressure surface is like the pressure surface in non-massaging examples of the prior art; when in a base position it is substantially flat and when it is in an arched position it is curvilinear along a continuous, un-varied or "smooth" path. The waves, corregations or other embodiments of the present invention rise or sink from the base level and vary its profile. The variations from the base level of a smooth profile may collectively be referred to as "convexities." It is these convexities that impart a massaging effect on a seat occupant as the pressure surface of the active portion of the lumbar support moves in and out or up and down.

Push paddle supports will have a pressure surface base level that does not change profile, but is extended or retracted for support. Tensioning straps have a pressure surface that does change profile in use, some times from concave to flat or from flat to convex. In either case a massage effect may be achieved, in advance over the prior art, by adding the convexities of the present invention to the base levels of those pressure surfaces.

Other aspects of the active portion 54, i.e., its interaction with the static portion 52 and actuators 56A and 56B, also remain according to the prior art. That is, in the depicted arching pressure surface embodiment of the present invention, the arching pressure surface 54 will have sliding mounts engaging the static guide rails 52. Moreover, Bowden cable attachments to the arching pressure surface 54 will apply and release traction according to the methods known in the prior art through Bowden cables 60. Likewise, in other embodiments not depicted, the interaction of an active portion, for example a push paddle or tensioning strap, with a static portion, for example a push paddle linkage or a strap anchor and tightener, are unchanged, and remain as dictated by the prior art. The present invention may be applied to augment pneumatic systems as well. See, e.g., U.S. Pat. No. 5,637,076, incorporated by reference herein.

The pressure surface facing and acting upon a seat occupant has novel surface characteristics according to the apparatus and method of the present invention. The arching pressure surface 54 is non-smooth on its face interacting with the upholstery or cushion that overlies it and through which the pressure surface imparts a tactile effect on the seat occupant. It is within the scope of the present invention that the arching pressure surface have any conceivable surface characteristic, including without limitation, waves, undulations, bumps, corrugations, semi-cylindrical projections, convexities and the like. In the depicted embodiment, simple semi-hemispherical "bumps" are on the arching pressure surface. Such surface characteristics will move in relation to a seat occupant when the active portion of the ergonomic support is activated, in a manner that will have the same effect as the prior art rollers on massage systems. That is, there will be some necessary movement of the "bumps"

orthogonal to the in and out motion of the arching pressure surface, concomitant with adjustment of. the arching pressure surface. Also, more directly, the bumps will move in a substantially vertical direction with the arching pressure surface, as the actuators 56A or 56B move the entire arching pressure surface 54 up and down on the static portion 52. The movement of the surface convexities will impart a massaging-type comfort to the seat occupant. This will be true both as the pressure surface remains static and, more especially, as it is moved up and down and in and out.

The stimulating effect on the seat occupant can be maintained, in some embodiments, by the addition of the cycling technology known in the prior art, (as in previously referenced U.S. Pat. No. 6,007,151) which allows the pressure surface to move in and out automatically in cycles according to user controlled settings.

The amplitude and frequency of the surface undulations in the arching pressure surface 54 may be any of a wide variety of values. The preferred range is from 3 to 15 millimeters in both amplitude (depth) and frequency (separation). Varying the depth and separation of bumps or undulations allows the system of the present invention to be customizable to various seats, whether furniture or automobile seats, various customer parameters for the thickness of cushioning and/or upholstery to be placed over the arching pressure surface, or the amount of massage effect requested by a customer. The shape of the surface variations may also be any of a broad range of shapes and still be within the scope of the present invention. A broad range further increases customer choices for the tactile effect to be selected and for compatability with the other components of the seat into which the ergonomic support is to be installed. Accordingly, non-smooth surface variations may include hemispherical shapes, semi-cylindrical shapes, any parallelogram, sinusoidal patterns, undulations, corrugations or waves of varying, truncated, uniform or changing amplitude and frequency or virtually any other non-smooth pattern or configuration.

Stamping or molding such surface variations into the pressure surface greatly reduces the weight, size and expense of massage unit while achieving comfort levels, lumbar fatigue relief, and tactile effects substantially equivalent, or nearly so, with the prior art roller massage units. This is true whether the active portion of the lumbar support is an arching pressure surface as depicted herein, or alternatively is a push paddle or tensioning strap type support. The weight, cost, assembly time and expense of riveting roller pins or axles to an active pressure surface, installing the rollers on the axles and capping the ends of the axles to prevent the rollers from coming off of them, are all saved. A single stamped metal or molded plastic unit is substantially lighter than the fabricated assembly of the prior art roller arrays. While the stamped or molded variable pressure surface of the present invention has depth, its operative engagement to the static portion and to the actuating linkage are simpler and more streamlined, thereby saving space in terms of the overall depth of the entire unit, or "package".

FIG. 6 is a schematic cross-section of one potential embodiment of the variable pressure surface of the present invention. There semi-circles 62 indicate a cross-section of hemispherical bumps stamped or molded into the otherwise flat base surface 64 of the pressure surface.

The other aspect of the present system that saves weight, space and expense is the elimination of mounting brackets for the actuators. By eliminating the need for a heavy pressure surface required for the support of a roller array, the present invention makes it possible to use smaller, less powerful and less expensive electric motors to actuate smaller and less expensive actuators and gear boxes. Moreover, the reduced power needs eliminate the requirement for added rigidity that cause prior art massage units to mount the actuators to the static portions of their supports with heavy brackets (18 on FIG. 1). It will be appreciated by those of skill in the art that even if the novel pressure surface of the present invention did not change the power and rigidity requirements for the actuators, the elimination of the brackets would still achieve package size reduction and installation flexibility of the ergonomic support unit of the present system.

In the depicted embodiment, actuators 56A and 56B are operatively engaged with the static portion 52 and active portion 54 of the ergonomic support through Bowden cables 58 and 60. These traction cables move a tractive wire through a sleeve or conduit, which is actuated by the actuator gear box powered in turn by the electric motor. Drawing the wire into the sleeve puts tractive force on the ergonomic support unit in order to move the active portion 54 relative to the static portion 52. In most configurations, traction on the Bowden cable causes the active portion to arch, tighten or extend a pressure surface out towards the seat occupant or support, and relaxation of the wire within the sleeve reduces tension in order to return an active portion to a flatter base position.

Another common motion of ergonomic support units performed by actuation linkages such as Bowden cables 58 and 60 is to raise or lower the entire active portion of the support unit. In the depicted embodiment, a Bowden cable raises the arching pressure surface 54 upwards or downwards on the static guide rails 52.

The advantages gained by releasing the actuator mounting from the static portion 52 of the support unit include a greater adaptability for mounting of the unit in varying seat frames; a great reduction in the "packaging" size, and savings in weight and cost by removing the added part of a mounting bracket. Since the seat frame, on the periphery of the seat, and devices mounted to it are generally not considered to be within the "packaging," ergonomic support units with independent actuators linked by adaptable actuation linkages such as Bowden cables 58 and 60, allow the ergonomic support system of the present invention to be marketed as a much smaller "package."

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, push paddle supports or tensioning strap type supports could employ the present invention. Thus, the breadth and scope of the present invention should not be limited by any of the above-described exemplary embodiments, but should be defined only in accordance with the following claims appended hereto and their equivalents.

What is claimed is:

1. A massaging ergonomic support mountable on various seat frames characterized in that:

a static portion (52) having anchors and mounts, said mounts being adaptable to fix said static portion to a seat frame;

an active portion (54) operatively engaged with said anchors of said static portion such that said active portion can move in and out of a plane defined by the frame of the seat, and said active portion having a pressure surface with a base level, said base level having integral convexities, said integral convexities adapted to impart a tactile effect upon a seat occupant as said active portion moves in or out of the plane defined by the frame of the seat; and at least one actuator, said actuator engaging the active portion by only an actuating linkage (60).

2. The massaging ergonomic support for a seat of a claim 1, further comprising at least one second actuator and at least one second actuating linkage (58), each actuator engaging the active portion by only one linkage, one of said actuators actuating in and out motion of said active portion and the other of said actuators actuating up and down motion of said active portion.

3. The massaging ergonomic support of claim 1, wherein said actuating linkage is a Bowden cable (60).

4. The massaging ergonomic support of claim 1, wherein said active portion is an arching pressure surface.

5. The massaging ergonomic support of claim 1, wherein said arching pressure surface is stamped metal.

6. The massaging ergonomic support of claim 1, wherein said arching pressure surface is molded plastic.

7. The massaging ergonomic support of claim 1, wherein said at least one actuator is driven by an electric motor.

8. The massaging ergonomic support of claim 1, wherein said base level of said active portion is smooth, and further comprising separately manufactured convexities that are attached to said base level.

9. The massaging ergonomic support of claim 1 further characterized in that:

said static portions are at least two guide rods (52), said guide rods having mounts adaptable to mount said guide rods on a frame of a seat;

said pressure surface also having upper and lower rod mounts, said rod mounts engaging said guide rods and at least one said upper or lower rod mounts being slideable along said guide rods;

a traction cable (60) having a sleeve and a wire disposed to slide axially through said sleeve, said sleeve having a first end engaging an upper portion or a lower portion of said pressure surface and said wire having a first end engaging the other of said upper portion or said lower portion of said pressure surface; and an actuator operatively engaged with a second end of said sleeve and a second end of said wire of said traction cable such that said actuator applies or releases traction to said pressure surface via said traction cable;

wherein application of said traction arches said pressure surface outward from a plane defined by guide rods.

10. The massaging ergonomic support of claim 1, wherein said convexities are semi-cylindrical projections.

11. The massaging ergonomic support of claim 1, wherein said convexities are semi-hemispherical projections.

12. The massaging ergonomic support of claim 1, wherein said convexities have an amplitude and frequency of 3-15 millimeters.

\* \* \* \* \*